United States Patent [19]

Miura et al.

[11] Patent Number: 4,830,332
[45] Date of Patent: May 16, 1989

[54] SOLENOID VALVE

[75] Inventors: Yasushi Miura, Nagoya; Kenji Hashimoto, Toyota, both of Japan

[73] Assignee: Aisin Seiki Kabushiki Kaisha, Kariya, Japan

[21] Appl. No.: 148,718

[22] Filed: Jan. 26, 1988

[30] Foreign Application Priority Data

Jan. 28, 1987 [JP] Japan ............... 62-10833[U]

[51] Int. Cl.⁴ ............................................. F16K 31/06
[52] U.S. Cl. .......................... 251/129.07; 251/129.15; 251/129.17
[58] Field of Search ...................... 251/129.07, 129.15, 251/129.17

[56] References Cited

U.S. PATENT DOCUMENTS 3,985,333  10/1976  Paulsen ........................ 251/129.07
4,582,088  4/1986   Cook et al. ................. 251/129.15 X
4,720,078  1/1988   Nakamura et al. ............ 251/129.15

FOREIGN PATENT DOCUMENTS 1109356  4/1968  United Kingdom .......... 251/129.07

Primary Examiner—Arnold Rosenthal
Attorney, Agent, or Firm—Oblon, Fisher, Spivak, McClelland & Maier

[57] ABSTRACT

A solenoid valve includes a non-magnetic main body having therein a solenoid coil and core, the core being formed of magnetic material and extending in the coil along the axial direction thereof. A plate member formed of a magnetic material is positioned at one end of the main body along the direction of movement of the core, and is integrally formed with the coil bobbin. A housing member having fluid communication passages therein is positioned adjacent the plate member at a side of the plate member opposite the main body. A valve structure actuatable by the core is positioned between the main body and the housing member for controlling fluid flow in fluid communication passages within the housing member. A yoke member formed of a magnetic material has a U-shaped including arms mechanically secured to the plate member, and has a bent portion mounted to the core.

4 Claims, 3 Drawing Sheets

SOLENOID VALVE

BACKGROUND OF THE INVENTION

1. Field of the Invention

The present invention relates to a solenoid valve and more particularly to a solenoid valve for controlling an actuator by switching over the supply of pressure thereto, and furthermore the present invention more particularly relates to a means for fixing a main body including an electro-magnetic mechanism, a yoke member and a housing member comprised in the solenoid valve.

2. Statement of the Prior Art

A conventional solenoid valve of this kind is disclosed, for example, in Japanese patent application laid-open publication No. 55-139575 published on Oct. 31, 1980. This conventional solenoid valve includes a housing member 1, a plate member 2, a yoke member 3 and a main body 4 as shown by FIG. 5. The main body 4 including a part of an electro-magnetic (not shown) and a housing member 1 including the communication passages oppose to each other and contact with each other so that a valve means (not shown) for controlling the communication between the communication passages of the housing member 1 is provided therebetween. The plate member 2 is engaged with the housing member 1 and includes holes, and the yoke member 3 is engaged with the main body 4 at its one end portion and includes nail portions 3a fitted into the holes of the plate member 2 at its another end portion. And the yoke member 3 is secured to the plate member 2 by bending the nail portions 3a of the yoke member 3, and the housing member 1 and the main body 4 are airtightly pressed onto each other and are fixed to each other by securing the nail portions 3a of the yoke member 3 to the holes of the plate member 2.

In the above prior art of the solenoid valve, however, the yoke member 3 and the main body 4 are not fixed to each other directly and are only contacted with each other by the magnetic force. Accordingly, in this structure, if the solenoid valve receives repeated high acceleration external vibrations, the securing portions of the nail portions 3a of the yoke member 3 come loose. As a result, the electro-magnetic mechanism located in the main body 4 and the valve means are bent and are broken by the above vibration and the airtightness of the communication passages is lowered.

SUMMARY OF THE INVENTION

It is therefore an object of the present invention to provide an improved solenoid valve which can obviate the above drawback.

It is another object of the present invention to raise the fixing integrity among the main body, the yoke member and the housing member.

It is a further object of the present invention to prevent the breakdown of the valve means and the electromagnetic mechanism by the vibration.

It is yet a further object of the present invention to provide an improved solenoid valve which includes a non-magnetic main body and a solenoid coil and core positioned in the main body, the core being formed of magnetic material movable in the coil along the axial direction of the coil and cooperating with the solenoid to comprise electromagnetic means. A plate member formed of a magnetic material is positioned at one end of the main body and is integrally formed with the coil bobbin. A housing member having fluid communication passages therein is positioned adjacent the plate member at a side thereof opposite the main body so that a portion of the plate member is mechanically secured to the housing member. Valve means actuatable by the electromagnetic means are provided for controlling fluid flow in the fluid communication passages. A yoke member formed of a magnetic material and having a U-shape includes arms mechanically secured to the plate member and a bent portion mounted to the core. As a result, the yoke member, main body, plate member are housing member are mechanically connected to one another.

BRIEF DESCRIPTION OF THE DRAWINGS

Additional objects and advantages of the present invention will become more apparent from the following detailed description of preferred embodiments thereof when considered with reference to the attached drawings, in which.

DESCRIPTION OF THE PREFERRED EMBODIMENT

A solenoid valve constituted in accordance with embodiments of the present invention will be described with reference of the drawings.

Figure 1:
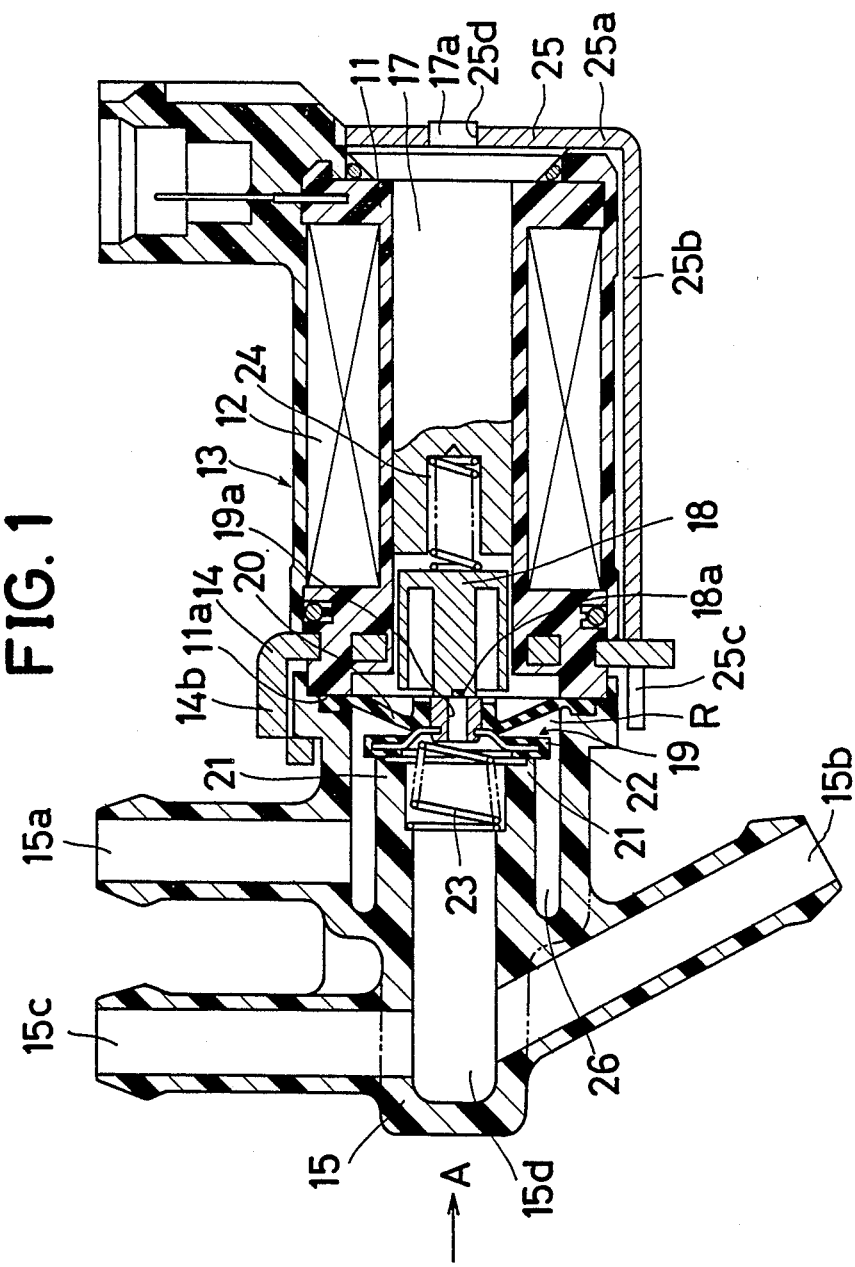
FIG. 1 is a cross sectional view of the preferred embodiment of the present invention.
Figure 2:
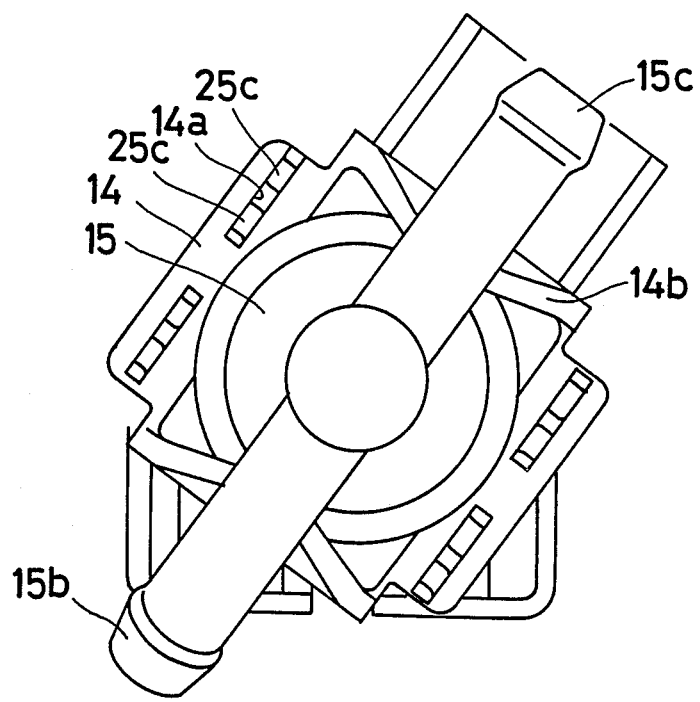
FIG. 2 is an elevation view of an A portion of FIG. 1.

In FIG. 1 and FIG. 2 of the appended drawings, the solenoid valve includes a molded resin main body 13 having disposed therein a solenoid coil 12 which is wound around the periphery of a bobbin 11 in an axial direction a plate member 14 made from a magnetic substance and fixed to one side of the bobbin 11 and a housing member 15 disposed adjacent the plate member 14 on a side thereof opposite the main body and made from a non-magnetic substance. The plate member 14 is insert-molded with the bobbin 11 so as to be secured with the main body 13 permanently. And the plate member 14 is projected from the outer circumferential surface of the main body 13 and the housing member 15 at its outer cicumferential surface, and its two projected portions are positioned symmetrically in regard to the center line of the housing member 15 and are provided with holes 14a, respectively, and its two remaining projected portions are provided with bent portions 14b which fit over the housing member 15. A core 17 which is secured in the bobbin 11 is disposed in the main body 13 and is provided with a projection portion 17a projected from the main body 13.

A yoke member 25 which is made from a magnetic substance is covered on the main body 13 and is formed into the U-shape. The yoke member 25 is provided with a bent portion 25a and a pair of arm portions 25b extended toward the plate member 14 in the axial direction. The bent portion 25a is provided with a hole 25d which is mounted onto the projection portion 17a and the core 17. The arm portions 25b are provided with anil portons 25c at their end portions, respectively, and the nail portions 25c are fitted into the holes 14a of the plate member 14 and are secured by transforming the nail portions 25c so as to separate them from each other, respectively. Accordingly, the yoke member 25 is tightly secured with the main body 13. And later on, the bent portions 14b are bent toward the center line of the housing member 15 and secured, respectively. Accordingly, the main body 13 is tightly and airtightly secured with the housing member 15.

A magentic circuit is formed by the solenoid coil 12, the core 17, the yoke member 25 and the plate member 14 upon energization of the solenoid coil 12. A movable core 18 which is made from a magnetic substance is disposed in the magnetic circuit so as to be positioned adjacent to the core 17 and is axially movable bi-directionally upon energization and deenergization of the solenoid coil 12.

The housing member 15 is provided with an inlet port 15a for fluid communication with a positive pressure source and outlet ports 15b, 15c ;l for fluid communication with a negative pressure source and a passage chamber 15d communicated with the inlet port 15a and outlet ports 15b 15c, respectively. A valve member 19 is disposed in the housing member 15 between the inlet port 15a and the outlet ports 15b, 15c. In this embodiment, the inlet port 15a is exposed to the atmosphere and the outlet ports 15b 15c typically are connected to the negative pressure source, such as an engine intake manifold. The valve member 19 includes a valve seal 22 which is in contact with a valve seat 21 provided in the housing member 15. A diaphragm 20 having an outer periphery secured to the housing member 15 is disposed between the housing member 15 and one end surface 11a of the bobbin 11, and has an inner periphery secured to a valve member 19. And the valve member 19 provided with a central hole 19a is connected to a groove 18a provided on one end surface of the movable core 18. In this structure, the valve seal 22 and the diaphragm 20 may be integrally formed to fix their mutual operative positions.

A valve spring 23 is disposed in the passage chamber 15d for biasing the valve member 19 toward the core 17. The passage chamber 15d is connected to the outlet ports 15b, 15c. The valve seal 22 is seated on the valve seat 21 by the force of the return spring 24 disposed between the core 17 and the movable core 18. In this structure, the one end surface of the valve member 19 contacts the one end surface of the movable core 18 constantly, and the valve member 19 and the movable core 18 are movable in one body. Numeral 26 is a pressure chamber R communicating with the inlet port 15a, and is communicable with the passage chamber 15d when the valve seal 22 is separated from the valve seat 21. A back pressure chamber R is defined by the diaphragm 20, the one end surface 11a of the bobbin 11 and the one end surface of the movable core 18.

When a negative pressure is transmitted from one of the outlet ports 15b, 15c, the valve member 19 receives the force defined by coordinating the effective area of the valve seal 22 and the negative pressure in the left direction as viewed in FIG. 1. The negative pressure also is applied to the back pressure chamber R through the central hole 19a and the groove 18a. The diaphragm 20 receives the force defined by coordinating the effective area of the diaphragm 20 and the negative pressure in the right direction as viewed in FIG. 1. Since the effective areas of the valve seal 22 and the diaphragm 20 are designed so as to be the same, there will be substantially no force exerted on the valve member 19. Only the force difference between the spring 23 and the return spring 24 is applied at the valve member 19 and the necessary force to move the valve member 19 is very small, i.e., the force difference between the spring 23 and the return spring 24. This structure allows a reduction in the weight and the cost of the solenoid valve. Accordingly, when the solenoid coil 12 is not energized, the valve member 19 is biased to the left direction as viewed in FIG. 1 by the force difference between the spring 23 and the return spring 24 and the valve seal 22 is airtightly seated on the valve seat, and the communication between the inlet port 15a and the outlet ports 15b, 15c is closed. When the solenoid coil 12 is energized, the magnetic flux is generated in the magnetic circuit by the solenoid coil 12, the movable core 18 is moved toward to the core 17 by the magnetic flux and valve member 19 is moved with the movable core 18 in one body by spring 23. And then the valve seal is separated from the valve seat 21 and the communication between the inlet port 15a and the outlet ports 15b, 15c is opened.

Further, the above solenoid valve is suitable for use where the inlet port 15a is connected with the negative pressure source and the outlet ports 15b, 15c are connected with the positive pressure source or where the one port is connected with the positive pressure source such as the atmosphere and the other port is selectively connected with the positive pressure source and the negative pressure source, for example, the system in which the inlet port 15a is connected with the atmosphere and the outlet ports 15b, 15c are connected with the passage which communicates between the rotor chamber of a super charger and the oil seal disposed between the rotor chamber and the gear chamber.

According to this embodiment of the present invention, since the main body 13 is secured to the yoke member 25 by the nail portions 25c fitted into the holes 14a of the plate member 14 formed the main body 13 in one body and further the main body 13 is secured to the housing member 15 by the bending portions 14b of the plate member 14 so as to press the housing member 15 between the main body 13 and the bending portions 14b, if the solenoid valve receives repeated high acceleration external vibrations, the securement of the yoke member and the plate member does not come loose. Therefore, the security against vibration becomes higher. And since the yoke member 25 and the plate member 14 which are contacted with each other by only magnetic force in the prior art are here mechanically secured to each other by the nail portions 25c fitted into the holes 14a of the plate member 14, the receipt and the delivery of the magnetism between the yoke member 25 and the plate member 14 which forms the magnetic circuit is more surely performed. Therefore, it is possible to reduce differences in the performance amongst the solenoid valves which are manufactured.

Figure 3:
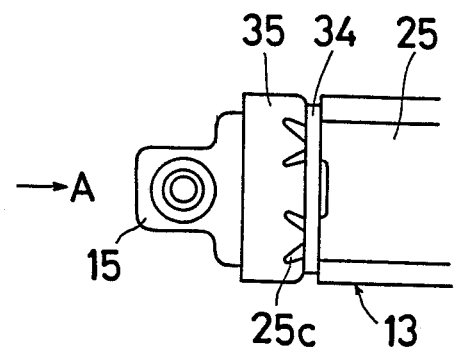
FIG. 3 is an elevation view of an essential portion of an alternative embodiment of the present invention.
Figure 4:
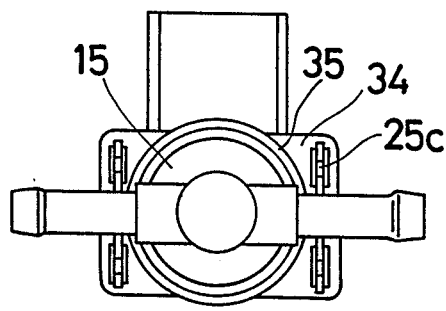
FIG. 4 is an elevation view of an A portion of FIG. 3.
Figure 5:
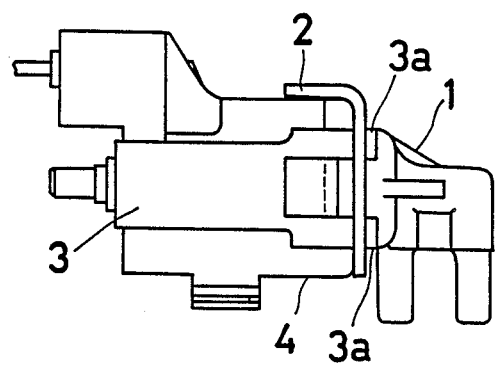
FIG. 5 is an elevation view of the prior art of the present invention.

Reference is now to FIG. 3 and FIG. 4 showing another embodiment of the present invention. In this another embodiment of the present invention, the two plate members 34, 35 are insert-molded with the main body 13, and the plate member 34 is secured to the yoke member 25 by the nail portions 25c fitted into the holes of the plate member. And the plate member 35 is secured to the housing member 15 by the bending portion along all its periphery. In this embodiment of the present invention, as in the above embodiment of the present invention, the effects as mentioned above are obtained.

In order to obviate the drawbacks of the prior art, it has been thought necessary in order to improve the wear-resistance of the valve member to make the main body and the housing member made from the metal. However it is necessary to cover the parts of lubricant and to dispose a sleeve member in order to improve the wear-resistance of the valve member. And therefore there are drawbacks as follows. Namely, operation noise is generated by the contact between the sleeve member and the valve member and the noise makes the driver's feeling uncomfortable. And the performance of the air-tightness is lowered by the lubricant covering and the manufacturing cost of the solenoid valve becomes high.

According to the present invention, since the yoke member is secured to the main body, the performance against the vibration becomes higher. Therefore, the above drawbacks are not generated. And since loosening the housing member by the repeated installation and removal of a hose onto the ports is not generated, the air-tightness of the valve member or the passage means is not deteriorated.

It will be apparent to those skilled in the art that the solenoid valve of the present invention may be constructed in a variety of ways without departing from the spirit and scope of the appended claims.

What is claimed is:

1. A solenoid valve comprising:
   a non-magnetic main body having a non-magnetic bobbin fitted therein;
   a core of magnetic material extending in said coil along the axial direction of said coil and cooperating with said solenoid to comprise electromagnetic means;
   a plate member formed of a magnetic material positioned at one end of said main body along the axial direction of said coil, said plate member being integrally formed with said bobbin;
   a housing member having fluid communication passages therein and being positioned adjacent said plate member at a side of said plate member opposite said main body, wherein a portion of said plate member is mechanically secured to said housing member;
   valve means actuatable by said electromagnetic means for controlling fluid flow in said fluid communication passages;
   a yoke member formed of a magnetic material and having a U-shape including arms mechanically secured to said plate member and a bent portion mounted to said core,
   whereby said yoke member, main body, plate member and housing member are mechanically connected to one another.

2. The valve of claim 1 wherein said plate member includes holes and bending portions, said yoke member includes a nail portion at ends of said arm portions, and said nail portions are fitted into said holes of said plate member and said nail portions secured to said plate member.

3. The valve of claim 2 wherein said housing member includes an inlet port and an outlet port, said valve means includes a valve member located in said housing member and having a sealing area exposed to the pressure from said outlet port when said valve means is in a closed position and a diaphragm means defining a back pressure chamber in fluid communication with said communication passages for offsetting an effect of a fluid pressure on the sealing area thereby reducing the electromagnetic force required to move said valve member.

4. The valve of claim 1 wherein said yoke member includes a nail portion at ends of said arm portions, said plate member includes two pieces of the plate member formed with said main body in one body, wherein one of said plate members is secured to said yoke member by said nail portions of said yoke member fitted into holes provided therein, and the other plate member is secured to said housing member by said bent portion.

* * * * *